May 4, 1965     C. W. ZIMMERMAN ETAL     3,182,286
ACOUSTIC WELL LOGGING TRANSMISSION SYSTEM
Filed April 1, 1960
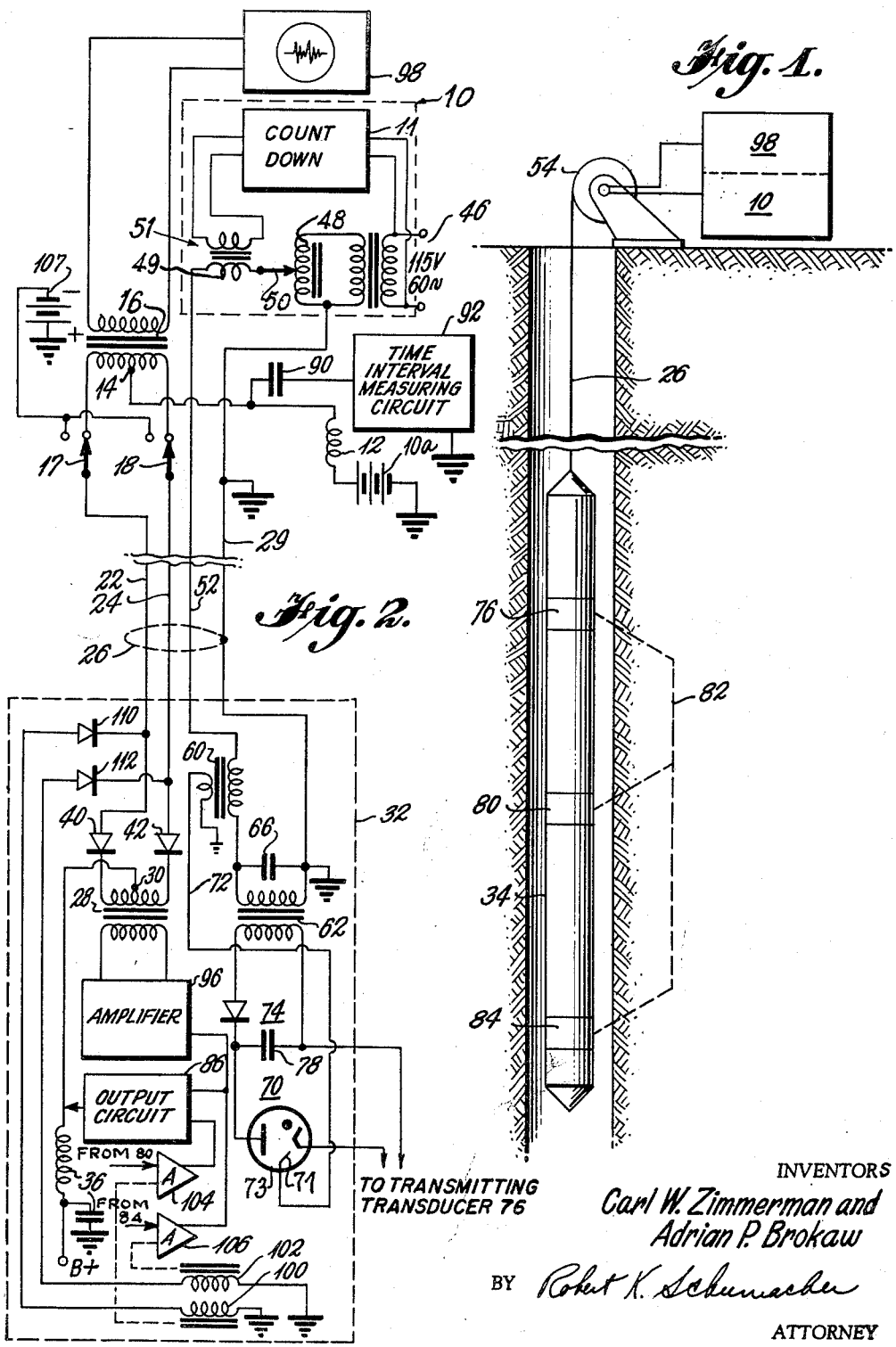
INVENTORS
Carl W. Zimmerman and
Adrian P. Brokaw
BY Robert K. Schumacher
ATTORNEY

United States Patent Office 3,182,286
Patented May 4, 1965

3,182,286
ACOUSTIC WELL LOGGING TRANSMISSION SYSTEM
Carl W. Zimmerman, Dallas, Tex., and Adrian P. Brokaw, Stillwater, Okla., assignors, by mesne assignments, to Dresser Industries, Inc., Dallas, Tex., a corporation of Delaware
Filed Apr. 1, 1960, Ser. No. 19,233
8 Claims. (Cl. 340—18)

The present invention relates to an improved transmission system for sending electrical signals from an acoustic well logging tool to surface equipment, and more particularly relates to a wave transmission system using four lines of a cable, or three lines and the armor sheath thereof, for transmitting and communicating different bits or portions of information.

The invention seeks to provide for the transmission of the necessary signals, power for energization and various control functions of a multiple receiver acoustic velocity logging system over a three conductor cable having an armor sheath.

This application is an improvement of the co-pending application of Allen W. Engle, John L. Casey and Adrian P. Brokaw, filed January 16, 1959 having Serial Number 787,292, for "Acoustic Well Logging System" now U.S. Patent No. 3,112,466.

Acoustic well logging systems are principally concerned with apparatus used to determine primary physical properties of sand, clay beds, rocks, etc., known generally in the art of geophysical exploration merely as rock. The acoustic properties of the rock are known to depend upon elasticity, state of aggregation, porosity, etc., and are analytically determined by computing the time interval for a pulse of acoustic energy to pass from one point to another point in the rock adjacent a well logging tool. In acoustic well logging systems, a well logging tool is suspended by a cable in a borehole. In conventional well logging systems, minimal bits of information in the form of electrical energy are required to be communicated between the surface equipment and the subsurface tool. These systems of analyzing subsurface conditions may use three conductors and a common armor sheath or connection, over which are conducted trigger pulses for initiating the passage of acoustic energy generated in the logging tool into the rock surrounding the borehole. Also it is necessary to conduct to the surface from the subsurface tool a pulse pair indicative of the time interval needed for acoustic energy to travel a predetermined distance of the surrounding rock media, so that the nature of the rock may be ascertained at the earth's surface. It is also essential that conductors to be provided in a cable for the transmission of what is called a "formation signature." This formation signature is a quasi-sinusoid wave and as is pointed out in "Continuous Velocity Logging," by G. C. Summers and R. A. Broding, "Geophysics," vol. XVII, No. 3 (July, 1952), at pages 602 and 603, the velocity is high enough that the separation of the received energy into three major components is apparent. The formation component is first to arrive; it has a frequency of about 11 kilocycles and has travelled at a formation bulk velocity. The second component arriving, composed of much higher frequency energy, has travelled at a velocity of about 5,000 feet per second. This has been tentatively indentified as the bulk compressional velocity of the drilling fluid. The third major component and last to arrive is composed of lower frequency energy and has travelled at a velocity of about 3,700 feet per second. It relates to the velocity of a wave in a tube affected by the elasticity or shear modulus of a wall.

The known acoustic well logging devices and transmission systems of the prior art require multiple conductor lines or wires connecting the surface with the subsurface equipment or tool. There are occasions when additional conductors are needed to connect the surface equipment with the subsurface tool such as for switching circuits for increasing or decreasing the amplification of electronic equipment in the well logging tool. In one instance it is known that rotary solenoids are used to switch different resistances to the input of an amplifier for varying its gain so that the signal may be properly amplified for reception at the surface. These rotary solenoid switches may be switched by pulses which are transmitted from the surface to the subsurface tool over these conductors of the connecting cable.

It is therefore an object of the invention to provide a minimum number of connecting wires in the cable between the surface equipment and the subsurface logging tool.

Also it is an object of the invention to provide a reduced number of conductors in a cable for a suspended well logging tool having the advantage that a minimum amount of cross-feed or cross-talk between various received pulses or signals such as the pulse pair and the formation signature signal.

One of the most important applications of the new transmission system is in so combining the circuit functions to permit transmission of the following with a minimum of interference:

(1) Pulse pairs containing acoustic velocity information as a function of the time position of the pulses of each pair;

(2) Formation signature, i.e., a signal characteristic of the acoustic properties of the environment in which sound is caused to pass through from the tool;

(3) D.C. power sent downhole to energize portions of the electronic circuits of the subsurface tool;

(4) Voltage pulses for selectively switching each of two attenuations to provide gain controls in each of two receiving channels;

(5) A.C. power to be stepped up in voltage by a transformer in the tool for rectification for supplying a source of voltage to pulse or energize the transmitting transducer;

(6) A synchronizing signal from the surface sent to the subsurface tool to trigger a switch tube for pulsing the transmitting transducer.

Other objects and advantages of the transmission system will be apparent from a detailed description of the invention and from the appended drawings and claims.

In the drawing:

FIG. 1 illustrates an acoustic well logging tool in a borehole connected by a cable to surface equipment; and FIG. 2 is a schematic diagram of a transmission system for acoustic well logging according to one embodiment of the present invention.

Referring now to the figures of the drawing, there is shown an acoustic well logging system wherein a current from a D.C. voltage source or battery 10a is coupled through an inductor 12 to a center tap 14 of the secondary winding on a transformer 16. The ends of the secondary winding of transformer 16 are connected through two single pole two-position switches 17 and 18 and thence to the conductors 22 and 24 of a cable 26. A cable sheath 29 is provided to form a return path for circuits connected thereto, and also is provided to mechanically support the tool 34. The other end of the cable terminates in a primary winding of a transformer 28 having a center tap connection 30 for coupling the current from the D.C. source 10a to an electronic equipment portion 32 of the well logging tool 34 through a filter network 36.

The cable conductors 22, 24 constitute a balanced transmission line. The cable with its conductors may extend 10,000 or 15,000 ft. down a borehole into the earth and where conventional types of coupling and conductors are used, there is a substantial amount of cross-talk, which is also known in the logging art as cross-coupling, or cross-feeding.

Cross-talk or cross-feeding is minimized by using a phantom circuit connected to the balanced line at taps 14, 30 and with a return path through ground or the cable sheath 29. In such a circuit the balanced transmission line carries a signal in the normal way; a second signal is sent over the conductors of the balanced line effectively connected in parallel, with the return path through a cable sheath 29 or ground. If perfect balance is attained, there will be no interference between signals sent over the phantom circuit and those sent in the normal way through the transmission lines.

The current from the D.C. voltage source 10a is connected to the center tap 14 of a winding of the transformer for passing the direct current to the subsurface instruments over the conductors 22 and 24 as part of a phantom circuit. There is no net flux produced in the core of transformers 16 and 28 due to the flow of the direct current. The return path of the direct current is through the ground connection or the armor sheath 29 of the cable 26.

Diodes 40 and 42 connected in the circuit with conductors 22 and 24 pass the direct current to the center tapped winding of transformer 28, and thence through the inductor of filter circuit 36 for furnishing substantially smooth direct current to operate vacuum tubes and the like in the logging tool instrument.

A synchronizer 10 is coupled to a conventional A.C. power source 46 which may have a frequency of 60 cycles per second. The power source 46 is coupled to an autotransformer 48 provided with a slide connection 50 and also to count-down circuit 11. The slide connection 50 couples the A.C. power through the winding 49 of transformer 51 to the sheath 29 of the cable and an inner conductor 52 of the acoustic well logging cable, which, as conventionally used, is lowered into a well bore over a measuring pulley 54. As described in greater detail in the aforesaid copending application Serial Number 787,292, now U.S. Patent No. 3,112,466, the count-down circuit 11 uses the power frequency current to derive a sync or a trigger pulse at a submultiple of the frequency of the power source. The count-down circuit provides a trigger pulse upon the A.C. voltage which is applied to the acoustic well logging tool cable by the transformer 51.

The sheath 29 and conductor 52 couple the A.C. power and the trigger pulse superposed thereon, to a pulse transformer 60 serially connected to the input of a step-up transformer 62 in the electronic equipment portion 32 of the tool.

A capacitance 66 may be connected across the input of the step-up transformer 62 in order to by-pass the trigger pulse to keep it from being coupled therethrough, and reduces transients reflected from a transmitter circuit 70 onto the cable. The output of the pulse transformer 60 provides a trigger pulse over conductor 72 to a grid 71 of a control tube 73, to operate the acoustic transmitting transducer 76. Power for the transmitter is supplied through a rectifying circuit 74 coupled to the secondary of the transformer. The operation of the transmitting circuit for producing a pulse to excite a transmitting transducer 76 in the logging tool is more particularly described in the aforesaid copending application Serial No. 787,292. When a trigger pulse is impressed upon the control grid of the tube to render the tube conductive, power is supplied to the tube which conducts and discharges the capacitance 78 through the tube 73 and the transmitting transducer 76. As the transmitting transducer is excited by the discharge of capacitance 78, the acoustic energy is propagated from the tool. Some of the acoustic energy is picked up by a receiving transducer 80 after passing along a path 82 through the formations. There may be another receiving transducer 84 and as the acoustic energy passes through the formations and reaches these receiving transducers 80, 84, the acoustic energy is converted into electrical energy in the form of pulse pairs, and the interval of time therebetween relates to the velocity of sound in the formations. These pulse pairs are produced in the output circuit 86 which may be thyratron tube circuits or blocking oscillators for developing high energy pulses. These are in the form of time position modulated pulse pairs. These pulses are fed onto the center tap of the winding of transformer 28 and pass over conductors 22 and 24 to transformer 16 where they are extracted from the center tap 14 of the winding and passed through capacitor 90 to the time interval measuring circuit 92. The return path for the pulses is through the armor or sheath 29 of the cable.

The inductor 12 is used to isolate the pulses from tap 14 from the power source 10a.

The diodes 40 and 42 are biased by the application of voltage from the power source 10a so that they will pass pulses of either polarity, although the specific pulses used are negative. This also permits transmission of oscillatory signals over conductors 22 and 24 as a balanced line.

The primary of transformer 28 is connected to an amplifier 96 which amplifies a "formation signature" signal that is also derived for one of the receiving transducers. The signal is coupled to cable conductors 22 and 24 forming a balanced transmission line through the transformer 28 and is sent along the cable. The formation signature signal is taken from the secondary of transformer 16 and applied to an oscilloscope 98 for visually monitoring the signal received from one of the receiving transducers, or for a presentation of the waveform for photographic analysis and for determining the formation characteristics such as shear velocity, and relative transmission characteristics of the rock.

Two single pole, two-position switches 17 and 18 are shown in the normal logging position. The purpose of these switches is to remotely and independently control each of two gain control relays or solenoids 100, 102 in the logging tool. In the case where there are two receiving transducers and amplifiers therefor, each switch 17, 18 may control respectively the gain of amplifiers 104, 106 connected to receiving transducers 80, 84, respectively, which supply electrical signals to output circuit 86 for the production of the aforesaid pulse pairs.

The solenoid-operated switches 100, 102 may be in the form of rotary stepping switches such as those made by G. H. Leland, Inc., under the trade name Ledex. The solenoids may independently drive (as indicated by the dashed lines) wafer type switches connected to conventional resistance networks (not shown) contained in the amplifiers 104, 106 to increase or decrease respectively the gain thereof at the will of the operator.

Although it is conceivable to operate each of the switches 17, 18 simultaneously so that the solenoids are driven also simultaneously, it is not a preferable method of operation of the switches, since there would then be no B+ power supplied over the phantom to the electronic apparatus 32 in the logging tool. For this reason it is desired to mechanically operate the switches 17, 18 so that they are interlocked. In practice the switches 17, 18 are designed so that only one may be moved at a time from its normal position. Then, only one conductor of the balanced transmission line is used for furnishing B+ to the logging tool, and the other conductor is useful in increasing or decreasing the gain of the respective amplifier 104 or 106.

The operation of switch 17 connects the negative polarity voltage source 107, which may be either a battery or a charged capacitor, to conductor 22 and causes solenoid 100 to advance its associated switch one position. Diode 110 passes the negative switching voltage whereas this diode also serves to block the positive voltage from source 10a before actuation of switch 17. Diode 40 serves to block the negative switching voltage from passing through the winding of transformer 28. Switch 18 operates independently of the switch 17 and controls independently the solenoid 102 in advancing the associated switch to its respective positions. Therefore it is possible to switch either solenoid 100 or 102 by closing switches 17 or 18, respectively.

It should be understood that the specific apparatus shown and described herein is intended to be representative only. Reference should therefore be made to the following claims in determining the full scope of the invention.

We claim:

1. An acoustic well logging transmission system comprising two conductors and a return path connecting an acoustic well logging tool with surface equipment, said two conductors forming a balanced transmission line, means coupling said balanced transmission line and said return path as a phantom circuit, said surface equipment including a first source of direct current, means for coupling said direct current source to said phantom circuit for transmission of direct current to the tool, means for coupling signals to said balanced transmission line, and switching means connected to said balanced transmission line at the surface equipment for sending direct current over at least one of the two conductors in a direction opposite to that of the direct current of the phantom circuit, utilization means in said logging tool, first polarity sensitive means connected to said balanced transmission line in the well logging tool for isolating the oppositely directed current from the phantom circuit, and second polarity sensitive means connected in the end of the balanced transmission line in the well logging tool for coupling the oppositely directed current to said utilization means while blocking therefrom direct current of the phantom circuit.

2. The acoustic well logging system of claim 1, wherein said utilization means comprises switching means for controlling amplifier gain in the well logging tool.

3. The acoustic well logging transmission system of claim 1, including an additional conductor connecting the well logging tool with the surface equipment over which there is coupled alternating current and a trigger pulse superposed thereon with said return path as a return.

4. The acoustic well logging transmission system of claim 1 wherein the first and second polarity sensitive means comprise a diode connected in series with each of the conductors of the balanced transmission line and a diode between each of the conductors of the balanced transmission line and the utilization means.

5. The acoustic well logging transmission system of claim 1 wherein the first and second polarity sensitive means are diodes connected in the balanced transmission line and between the balanced transmission line and the utilization means, and said switching means is so constructed that when the oppositely directed current is sent over one of the conductors of the balanced line there is concurrently sent said direct current over the other of the conductors with said return path as a return.

6. The acoustic well logging transmission system of claim 2 wherein said switching means maintains the connection of the first source of direct current over one of the conductors of the balanced line while the source of direct current is connected over the other conductor of the balanced line.

7. An acoustic well logging transmission system comprising two conductors and a return path connecting an acoustic well logging tool with surface equipment, said two conductors forming a balanced transmission line, means coupling said balanced transmission line and said return path as a phantom circuit, said surface equipment including a first source of direct current, means for coupling said direct current source to said phantom circuit for transmission of direct current to the well logging tool, a second source of direct current opposite in direction to the direct current from said first source, a switching means in said balanced transmission line for connecting said second source of direct current to at least one of said two conductors instead of and in a direction opposite to that of the direct current from said first source, utilization means in said logging tool, the well logging tool having first polarity sensitive means connected in said balanced transmission line for blocking the current from said second source from the phantom circuit, and the well logging tool also having second polarity sensitive means connected in the balanced transmission line to couple the current from said second source to said utilization means and block therefrom current from said first source and means for coupling signals to said balanced transmission line.

8. The acoustic well logging system of claim 7, wherein said utilization means comprises switching means for controlling amplifier gain in the well logging tool.

References Cited by the Examiner

UNITED STATES PATENTS

| | | | |
|---|---|---|---|
| 706,318 | 8/02 | Howell | 179—15 |
| 2,190,686 | 2/40 | Slichter. | |
| 2,708,485 | 5/55 | Vogel | 181—.53 |
| 2,737,639 | 3/56 | Summers et al. | 181—.53 X |
| 2,931,455 | 4/60 | Loofbourrow | 181—53 |

SAMUEL FEINBERG, *Primary Examiner.*

CHESTER L. JUSTUS, C. W. ROBINSON, *Examiners.*